(12) United States Patent
Hitzler et al.

(10) Patent No.: US 11,971,502 B2
(45) Date of Patent: Apr. 30, 2024

(54) HIGH-FREQUENCY MODULE

(71) Applicant: Endress+Hauser SE+Co. KG, Maulburg (DE)

(72) Inventors: Martin Hitzler, Dillingen (DE); Winfried Mayer, Buch (DE)

(73) Assignee: Endress+Hauser SE+Co. KG, Maulburg (DE)

( * ) Notice: Subject to any disclaimer, the term of this patent is extended or adjusted under 35 U.S.C. 154(b) by 383 days.

(21) Appl. No.: 17/261,162

(22) PCT Filed: Jun. 13, 2019

(86) PCT No.: PCT/EP2019/065454
§ 371 (c)(1),
(2) Date: Jan. 18, 2021

(87) PCT Pub. No.: WO2020/015935
PCT Pub. Date: Jan. 23, 2020

(65) Prior Publication Data
US 2021/0341568 A1 Nov. 4, 2021

(30) Foreign Application Priority Data
Jul. 16, 2018 (DE) .................. 10 2018 117 166.8

(51) Int. Cl.
*H01Q 1/22* (2006.01)
*G01F 23/284* (2006.01)
(Continued)

(52) U.S. Cl.
CPC ............ *G01S 7/032* (2013.01); *G01F 23/284* (2013.01); *H01Q 1/225* (2013.01); *H01Q 1/2283* (2013.01); *G01S 13/88* (2013.01)

(58) Field of Classification Search
CPC ....... G01S 7/032; G01F 23/284; H01Q 1/225; H01Q 1/2283
(Continued)

(56) References Cited

U.S. PATENT DOCUMENTS

| | | | | |
|---|---|---|---|---|
| 4,849,723 A * | 7/1989 | Oliver, Jr. | .............. | G02B 6/264 333/248 |
| 6,249,244 B1 * | 6/2001 | Heidecke | .............. | G01F 23/284 367/908 |

(Continued)

FOREIGN PATENT DOCUMENTS

| | | |
|---|---|---|
| DE | 9312251 U1 | 12/1993 |
| DE | 102006023123 A1 | 1/2007 |

(Continued)

*Primary Examiner* — Peguy Jean Pierre
(74) *Attorney, Agent, or Firm* — Kelly J. Smith; Endress+Hauser (USA) Holding, Inc.

(57) ABSTRACT

Disclosed is a high frequency module for producing or processing radar signals for use in radar-based fill-level measuring devices. The high frequency module includes: a semiconductor component to produce or to process electrical, high frequency signals; a dielectric coupling element contacted with the semiconductor component to couple the high frequency signals as radar signals into a dielectric waveguide or in order to couple radar signals from the waveguide as electrical, high frequency signals into the semiconductor component. The coupling element and the waveguide form a plug contact. In the case of appropriate design of the plug contact there results upon plug-in a self-centering, so that need for a complex adjustment during manufacturing is absent. Since radar frequencies of above 100 GHz can be produced by the semiconductor component, corresponding fill level measuring devices are characterized by a high measuring resolution and compact structures.

11 Claims, 3 Drawing Sheets

(51) Int. Cl.
  *G01S 7/03* (2006.01)
  *G01S 13/88* (2006.01)
(58) Field of Classification Search
  USPC ..................................................... 343/700 R
  See application file for complete search history.

(56) References Cited

U.S. PATENT DOCUMENTS

| | | | |
|---|---|---|---|
| 7,068,213 | B2 | 6/2006 | Müller et al. |
| 8,705,953 | B2 * | 4/2014 | Schriefer ................ G01S 13/36 |
| | | | 356/336 |
| 2002/0080080 | A1 | 6/2002 | Kloefer et al. |
| 2011/0187602 | A1 * | 8/2011 | Nair ..................... H01Q 21/065 |
| | | | 343/700 MS |
| 2012/0050125 | A1 | 3/2012 | Leiba et al. |
| 2017/0093009 | A1 * | 3/2017 | Herbsommer ....... H01Q 13/085 |
| 2017/0141474 | A1 | 5/2017 | Hengstler et al. |
| 2021/0341568 | A1 * | 11/2021 | Hitzler ................ H01Q 1/2283 |

FOREIGN PATENT DOCUMENTS

| | | |
|---|---|---|
| DE | 102015108479 A1 | 12/2015 |
| DE | 102015105657 A1 | 10/2016 |
| WO | 2016092084 A1 | 6/2016 |

\* cited by examiner

HIGH-FREQUENCY MODULE

CROSS-REFERENCE TO RELATED APPLICATIONS

The present application is related to and claims the priority benefit of German Patent Application No. 10 2018 117 166.8, filed on Jul. 16, 2018 and International Patent Application No. PCT/EP2019/065454, filed on Jun. 13, 2019, the entire contents of which are incorporated herein by reference.

TECHNICAL FIELD

The invention relates to a high-frequency module for producing and/or processing radar signals, especially a high-frequency module intended for use in radar based fill-level measuring devices.

BACKGROUND

Radar based distance measurement is used for a wide variety of applications. Corresponding distance measuring devices are applied, for example, for position determination in aviation, for distance measurement in motor vehicles, and for fill level measurement in process automation for industrial plants. Used as measuring method is, besides the pulse travel-time method, predominantly the FMCW method ("Frequency Modulated Continuous Wave", also known as continuous wave radar). Both methods are operated at defined radar-frequencies, or within defined frequency bands (in the context of this invention, the concepts, "radar" and "high-frequency", refer to electrical signals, or electromagnetic waves, with frequencies between 0.03 GHz and 300 GHz). The functional principles of FMCW- and pulse radar-based fill-level measuring devices are described, for example, in "Radar Level Measurement"; Peter Devine, 2000.

In the field of fill level measurement, primarily radar frequencies of 6 GHz, 26 GHz and 79 GHz are used. In such case, at least for FMCW, higher frequency bands are preferable, since in these cases a greater absolute frequency-bandwidth can be utilized. In the case of 79 GHz, for example, a bandwidth of 2 GHz is utilized, thus from 78 GHz to 80 GHz. With a higher bandwidth, in turn, a higher resolution of the distance measurement can be achieved. Especially in the case of fill level measurement, this is an important advantage, since, depending on application, an as exact as possible knowledge of the fill level is required. A further advantage of the application of high frequencies is that a radar based distance measuring device can be equipped with a smaller antenna, without that the bundling effect of the antenna is reduced. In the case of fill level measurement, then, for example, smaller connection flanges become possible for mounting on the container. Therefore, it is desirable to operate fill level-, or distance, measurement in general even at frequencies higher than 79 GHz (e.g. up to radar frequencies of 300 GHz).

Radar signals at frequencies of above 100 GHz can no longer be led between the semiconductor component, with which the corresponding electrical high-frequency signal is formed, and the circuit card, on which the semiconductor component is mounted, via hybrid connection technologies. Since the dimensions of the connection structures, such as bond wires and solder joints to the particular electronic components lie in the order of magnitude of the wavelength of the radar signals, these connection structures act as parasitic elements and disturb the transmission. Moreover, many of the materials usual in electronics bring about losses rising with frequency, such that the electrical high-frequency signals are significantly attenuated even after having traveled only short conductor distances. An effective and reliable contacting of the semiconductor component by means of hybrid standard technologies becomes for this reason more and more difficult as frequency increases.

Therefore, for producing, or for receiving, radar signals, especially radar signals above 60 GHz, semiconductor components are used, from which the electrical high-frequency signal can be radiated directly as radar signal, or with which incoming radar signals are transformable directly into corresponding electrical high-frequency signals. Thus, a hybrid signal transfer is no longer required. The radiating and/or the in-coupling of the radar signals occurs via a corresponding primary radiator. In such case, for example, a planar antenna is provided, which is applied by means of micromechanical methodology on the semiconductor component. Such a semiconductor component is described in, among others, DE 10 2015 119 690 A1. Thus, it is avoided that the electrical high-frequency signals need to be led via external conductive traces, soldered connections or bond wires. This reduces, exactly at high frequencies, susceptibility to performance degradation and disturbance of the distance measuring device.

Advantageously, a monolithic implementation provides, additionally, that both the signal production as well as also the signal evaluation can be implemented in the same semiconductor component. For this, depending on measuring method, known circuit components can be implemented: in the case of FMCW, the high-frequency signal for the radar signal to be transmitted can be produced by means of a PLL ("phase locked loop"); The received radar signal can be mixed in a mixer with the instantaneously transmitted high-frequency signal, so that the distance, and fill level, can be ascertained from the difference-frequency of the mixed signal. A correspondingly designed evaluation block can ascertain the difference-frequency, for example, by means of an FFT ("Fast Fourier Transformation") of the mixed signal.

In order that the semiconductor component can out-couple and in-couple radar signals efficiently, the housing of the semiconductor component must be appropriately encapsulated. A complete surrounding of the semiconductor component by means of injection molding, such as occurs, for example, in the case of SMD components ("Surface Mount Device"), is not possible, since the radar signals can be attenuated, or completely absorbed, thereby. In U.S. Pat. No. 9,583,811 B2, for example, a semiconductor component is described, which is suitably encapsulated, in order to couple high-frequency signals as radar signals into a hollow conductor. In this regard, the encapsulation there includes a hollow conductor, which is arranged galvanically separated via the semiconductor component. In order to position the hollow conductor correctly with reference to the semiconductor component, however, in given cases, a correspondingly complex adjustment is required in the applying of the encapsulation.

SUMMARY

An object of the invention is, therefore, to provide a simply manufactured high-frequency module, with which radar signals can be efficiently out- and in-coupled.

The invention achieves this object with a high-frequency module, which includes components as follows:

a semiconductor component, which is embodied to produce and/or to process electrical, high-frequency signals, preferably high-frequency signals having a frequency of at least 60 GHz, a dielectric coupling element, which is contacted with the semiconductor component, in order to couple the high-frequency signals as radar signals into a waveguide, and/or in order to couple radar signals from the waveguide as electrical signals into the semiconductor component.

In such case, the coupling element and the waveguide of the invention are so formed that they form a plug contact. In this regard, the concept "contact" relates not to electrical conductivity or mechanical contact, but to the ability to transfer the radar signal in the intended mode loss minimized from the coupling element into the waveguide and vice versa.

A simple opportunity to construct the plug contact is to design the plug contact as a depression in the waveguide or in the coupling element, and as a corresponding structure in the other component, namely the coupling element or the waveguide, as the case may be.

In such case, the depression can be embodied conically, wherein the structure, which corresponds to the depression, is formed with correspondingly conical, or frustoconical, shape. In such case, the cone can taper, for example, between 30° and 60°. Alternatively to a conical form, it is, for example, also an option to provide the plug contact in the form of a hemispherically shaped structure. Both hemispherically shaped-as well as also conically shaped designs favor a self-centering of the waveguide in its assembly: To the extent that the coupling element is secured, for example, by means of a non-conductive adhesive, on the semiconductor component, the waveguide can then be plugged into the coupling element, without it being necessary that the cone and the corresponding depression be first exactly aligned. This lessens the necessity for adjusting during the manufacturing.

For the case, in which the waveguide is held in a cover, such as, for example, an injection molding cover, and the semiconductor component with the coupling element is arranged on a circuit board substrate, the cover can be secured on the circuit board substrate (for example, by adhesive, laser welding or soldering). Thus, the contacting of the plug contact and the encapsulation of the semiconductor component by the cover can occur in a shared populating step. In such case, besides the self-centering and the saved process step, another advantage is obtained, namely that a strain relief is provided for the plug contact. Since the populating occurs, as a rule, vertically with reference to the circuit board, it is required that the plug contact and the cover be correspondingly embodied. Alternatively or supplementally to an encapsulation by the cover, it is, moreover, possible, such as known from the state of the art, to encapsulate the semiconductor component with a potting compound, provided that the semiconductor component remains free of potting compound at its contact with the coupling element.

For efficient in-coupling of the electrical, high-frequency signals or the radar signals into the coupling element, the semiconductor component can have on the contact area, for example, a planar metal structure, especially a patch structure, with a minimum edge length of a fourth of the wavelength of the radar signals.

For promoting low loss emitting of the radar signals, the coupling element and the waveguide are preferably made of a dielectric material having a dielectric constant of at least two. For this, a suitable synthetic material or an appropriate ceramic such as $Al_2O_3$ can be applied. In this regard, the coupling element and the waveguide can in the region of the plug contact, moreover, be jacketed, especially by a metal or a foam material (having a dielectric constant in the range of vacuum, for example, a PMI based, rigid foam material). In this way, there results, besides assuring the electromagnetic waveguide effect, additionally a mechanical stabilizing in the region of the plug contact.

With respect to the frequency of the radar signal, the waveguide is preferably so dimensioned that only one mode is capable of propagation, in order to prevent undesired mode dispersion. Mode dispersion is additionally prevented, when the waveguide is so embodied such that the fundamental mode or at least a low mode is capable of propagation. In such case, it is, within the scope of the invention, not fixedly prescribed, whether the waveguide has a rectangular, round or otherwise formed cross section.

In a further development of the plug contact of the invention, such can be embodied supplementally engageable. This can be achieved, for example, by designing the waveguide and the coupling element with barbs and corresponding catches. In this way, an unintended separation of the plug contact after assembly can be prevented.

With the high-frequency module of the invention, a radar based distance measuring device can be constructed, which can be used for determining distance to a measured object. Proviso for this is that the semiconductor component be embodied to convert the in-coupled high-frequency signal of the FMCW method or the pulse travel-time method into an evaluation signal with a lower frequency. Besides the high-frequency module of the invention, such a distance measuring device includes at least one antenna adjoining the waveguide. In such case, the antenna can be, for example, a hollow conductor antenna, such as a horn antenna. The antenna serves to transmit the radar signals toward the measured object and after reflection on the measured object to receive reflected signals back. Additionally, the semiconductor component must be embodied corresponding to the implemented measuring method (pulse-travel time or FMCW), in order to determine distance based at least on the reflected radar signals. As indicated above, a distance measuring device based on the high-frequency module of the invention is especially useful for application as a fill-level measuring device for measuring a fill level of a fill substance located in a container, since thanks to the enabled high radar frequencies a high resolution of the fill level measurement can be achieved.

BRIEF DESCRIPTION OF THE DRAWINGS

The invention will now be explained in greater detail based on the appended drawing, the figures of which show as follows.

DETAILED DESCRIPTION

Figure 1:
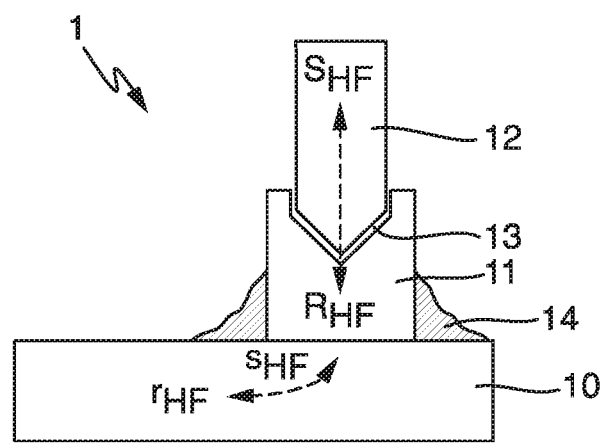
FIG. 1 shows a schematic illustration of the high-frequency module of the present disclosure.

FIG. 1 shows the high-frequency module 1 of the invention with its essential components as follows:
- a semiconductor component 10,
- a coupling element 11 of a dielectric material, such as, for example, $Al_2O_3$, and
- a waveguide 12 likewise manufactured of a dielectric material.

The semiconductor component 10 serves in the illustrated form of embodiment, on the one hand, for producing an electrical high-frequency signal $s_{HF}$, by means of which, in turn, a radar signal $S_{HF}$ can be generated. Corresponding to the desired frequency of the radar signal $S_{HF}$, the semiconductor component 10 is embodied to produce the high-frequency signal $s_{HF}$, for example, in a frequency band around 100 GHz. For this, the semiconductor component 10 can include circuit components known for FMCW, for example, a PLL ("Phase Locked Loop").

On the other hand, semiconductor component 10 serves for in-coupling received radar signals $R_{HF}$ (within the scope of the invention, of course, the semiconductor component 10 could also be embodied exclusively for producing or for in-coupling and processing the radar signals $S_{HF}$, $R_{HF}$, respectively, in which case separate units could be used, one for producing $S_{HF}$ and one for in-coupling and processing $R_{HF}$). The out- and in-coupling of the high-frequency signals $s_{HF}$, $r_{HF}$ can occur on the part of the semiconductor component 10 by means of a contact area for coupling element 11, wherein the contact area can be embodied, for example, in the form of a planar, metallized patch structure 21 with a minimum edge length of a fourth of the wavelength of the radar signals $S_{HF}$, $R_{HF}$ (compare FIG. 3).

After receiving the radar signal $R_{HF}$ (for example, as echo of the transmitted radar signal $S_{HF}$ on a measured object 3), the in-coupled high-frequency signal $r_{HF}$ can be mixed, for example, by a high-frequency mixer, with the instantaneously produced high-frequency signal $s_{HF}$, so that a distance d to the particular measured object 3 can be ascertained based on the difference frequency of the mixed signal. A correspondingly programmed computing unit can ascertain the difference frequency, for example, by means of an FFT ("Fast Fourier Transformation") of the mixed signal. From the difference frequency, the distance d can be ascertained, for example, using stored distance values d of a look-up-table. The value pairs of the stored distance values d and the corresponding difference frequency ranges can, in turn, be based on calibration data.

The coupling element 11 performs the in/out-coupling of the radar signals $S_{HF}$, $R_{HF}$ into, and out of, the waveguide 12. The waveguide 12, in turn, serves either for the radiation of the radar signals $S_{HF}$ into free space or for the receipt of radar signals $R_{HF}$ from free space. In such case, the waveguide ends in an antenna, such as, for example, a horn antenna.

Besides that, the waveguide 12 can end in a rod- or cable-like probe, by means of which, for example, fill levels can be determined according to the TDR principle ("Time Domain Reflectometry").

The coupling element 11 of the embodiments of FIG. 1 to FIG. 4 is secured by means of an electrically non-conductive adhesive 14 on the upper contact area of the semiconductor component 10. In such case, the patch structure 21 of the contact area and the coupling element 12 are so embodied as regards their geometries that the transfer of the radar signals $S_{HF}$, $R_{HF}$ between the semiconductor component 10 and the coupling element 11 is maximized. This corresponds to an impedance matching.

As regards the frequency of the radar signal, the waveguide 12 is so dimensioned that the radar signal $S_{HF}$, $R_{HF}$ is only capable of propagation in one (fundamental-) mode. Thus, for example, the waveguide 12 can be embodied with a rectangular cross section, wherein a first edge length of the cross section corresponds, for instance, to ⅔ of the wavelength of the radar signal $S_{HF}$, $R_{HF}$. The second edge length of the rectangular waveguide-cross section is then dimensioned with about ⅓ of the wavelength of the radar signal $S_{HF}$, $R_{HF}$. In the case of such a dimensioning, especially HDPE ("High-Density Polyethylene") is suitable as material of the waveguide 12.

According to the invention, the coupling element 11 and the waveguide 12 form in the case of the embodiments shown in FIG. 1 to FIG. 4 a cone shaped plug contact 13, wherein the cone tapers with an angle of about 45°. According to the invention, this means that the high frequency module 1 can be manufactured with little effort: as soon as the coupling element 11 is secured on the semiconductor component 10, the waveguide 12 can be introduced into the coupling element. This offers the advantage that the waveguide 12 can be plugged into the coupling element 11, without that the cone and the corresponding depression need to be directly aligned for the assembly. In this way, the need for adjusting in the manufacturing is significantly reduced.

Figure 2:
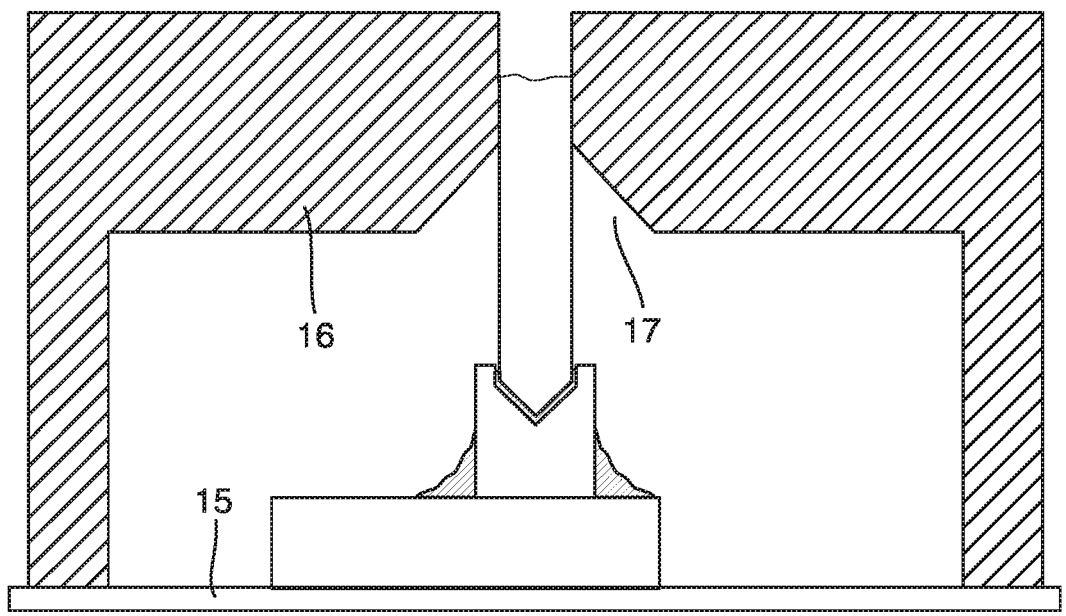
FIG. 2 shows an encapsulation of the high-frequency module.
Figure 3:
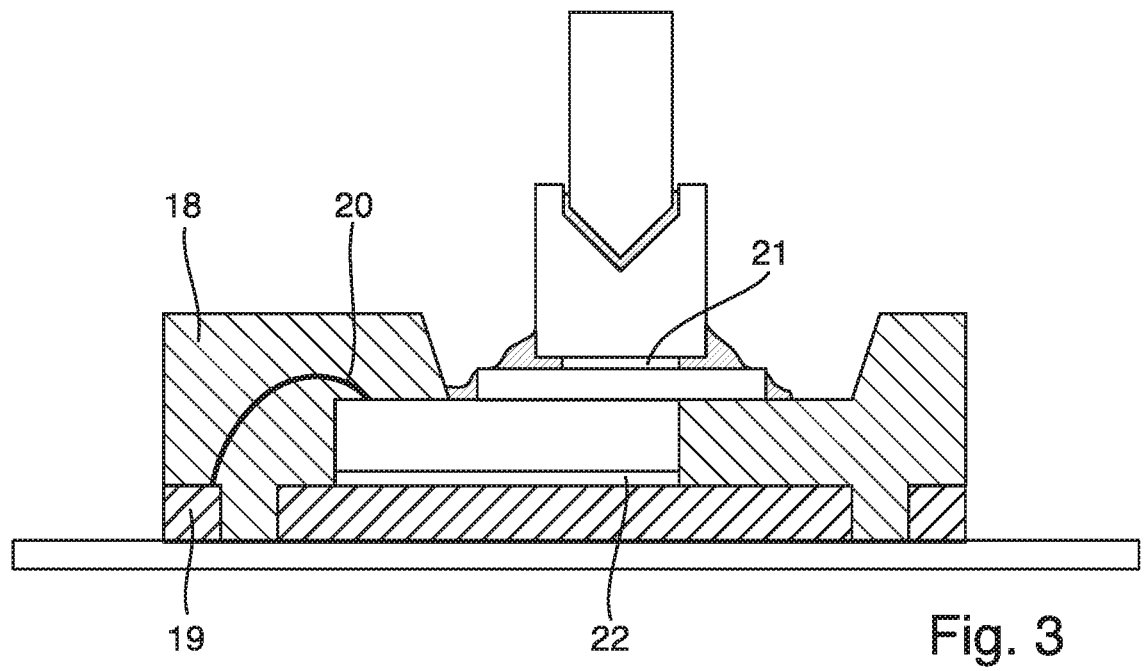
FIG. 3 shows an encapsulation of the semiconductor component.

Likewise shown in FIGS. 2 and 3 is that adhesive can be interposed in the plug contact between waveguide 12 and coupling element 11. This offers the advantage that plug contacts of the invention can no longer undesirably loosen after the manufacturing. Alternatively, an option is to make the plug contact 13 structurally engageable. Likewise an option is a contactless contact, i.e. a contact having an (air-) gap. Advantageously, this provides that the contact is comparatively insensitive to a horizontal or vertical offset between the coupling element 11 and the waveguide 12.

As is moreover evident from FIGS. 2 and 3, the semiconductor component 10 is usually arranged on a circuit board substrate 15. Since the high frequency signals $s_{HF}$, $r_{HF}$ do not need to be led on the circuit board substrate 15, all additional signal- or supply paths between the circuit board substrate 15, or a lead frame 19, and the semiconductor component 10 can be implemented via conventional connection technologies, such as bond wires 20 or electrically conductive adhesive connections 22 (e.g. a ball-grid array).

In the case of the embodiment of the high frequency component 1 illustrated in FIG. 2, the dielectric waveguide 12 is held in a (potting compound-) cover 16. In such case, the cover 16 is secured only on the circuit board substrate 15 and surrounds the upper side of the semiconductor component 10 completely. Besides providing an encapsulation of the semiconductor component 10, this offers the advantage that the plug contact 13 receives a strain relief thereby. Structurally, this can be supported by so embodying the cover 16 and the waveguide that the waveguide 12 in the plugged state, thus when the cover 16 is secured on the circuit board 15, experiences a minimum compression.

FIG. 3 illustrates that the semiconductor component 1 can (in given cases, in addition to the cover shown in FIG. 2, also) be encapsulated by means of a potting compound encapsulation 18, wherein the patch structure 21, and the contact area for coupling element 11, remain free of the encapsulation. Thus, the semiconductor component 10 could be encapsulated, for example, in an SMD- or DIP housing, to the extent that the semiconductor component is not arranged without encapsulation ("bare die") on the circuit board 15. Moreover, the embodiment of the high frequency module 1 shown in FIG. 3 includes a (dielectric) coupling structure between the patch structure 21 and the semiconductor component 10. In the case of appropriate dimensioning of its thickness, the transmission between the semiconductor component 10 and the patch structure 21 is greatly increased.

Figure 4:
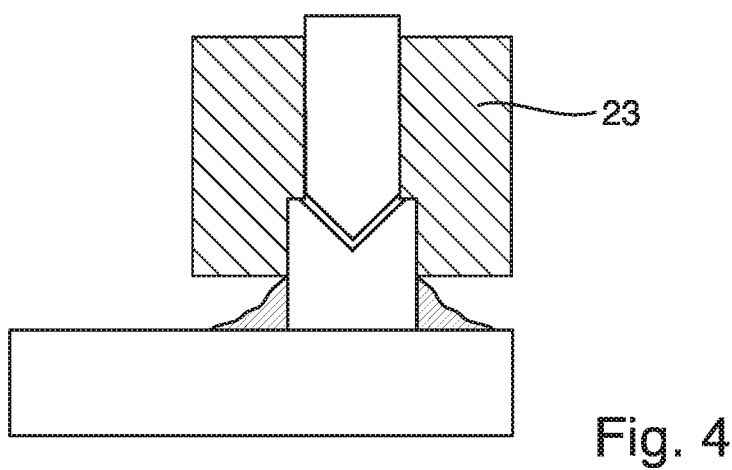
FIG. 4 shows a jacketing of the plug contact.

FIG. 4 shows how the plug contact can be protected mechanically by a jacketing 23 of the waveguide 12 and the coupling element 11. In order that the waveguiding properties of the coupling element 11 and of the waveguide 12 are not influenced by the jacketing, the jacketing 23 can be appropriately embodied. For instance, the jacketing 23 can be manufactured of a material having a dielectric constant like air or vacuum (=1). Porous rigid foam, for example, based on PMI ("polymethacrylimide"), is, thus, a candidate. Alternatively, an option is to metallize at least the inner surface of the jacketing 23, so that the radar signals $S_{HF}$, $R_{HF}$ are reflected thereby. Besides increasing mechanical stability, the jacketing 23 can serve as guide for the waveguide 12 at the plugging in, so that the manufacturing of the high frequency module 1 is, in turn, facilitated thereby.

Figure 5:
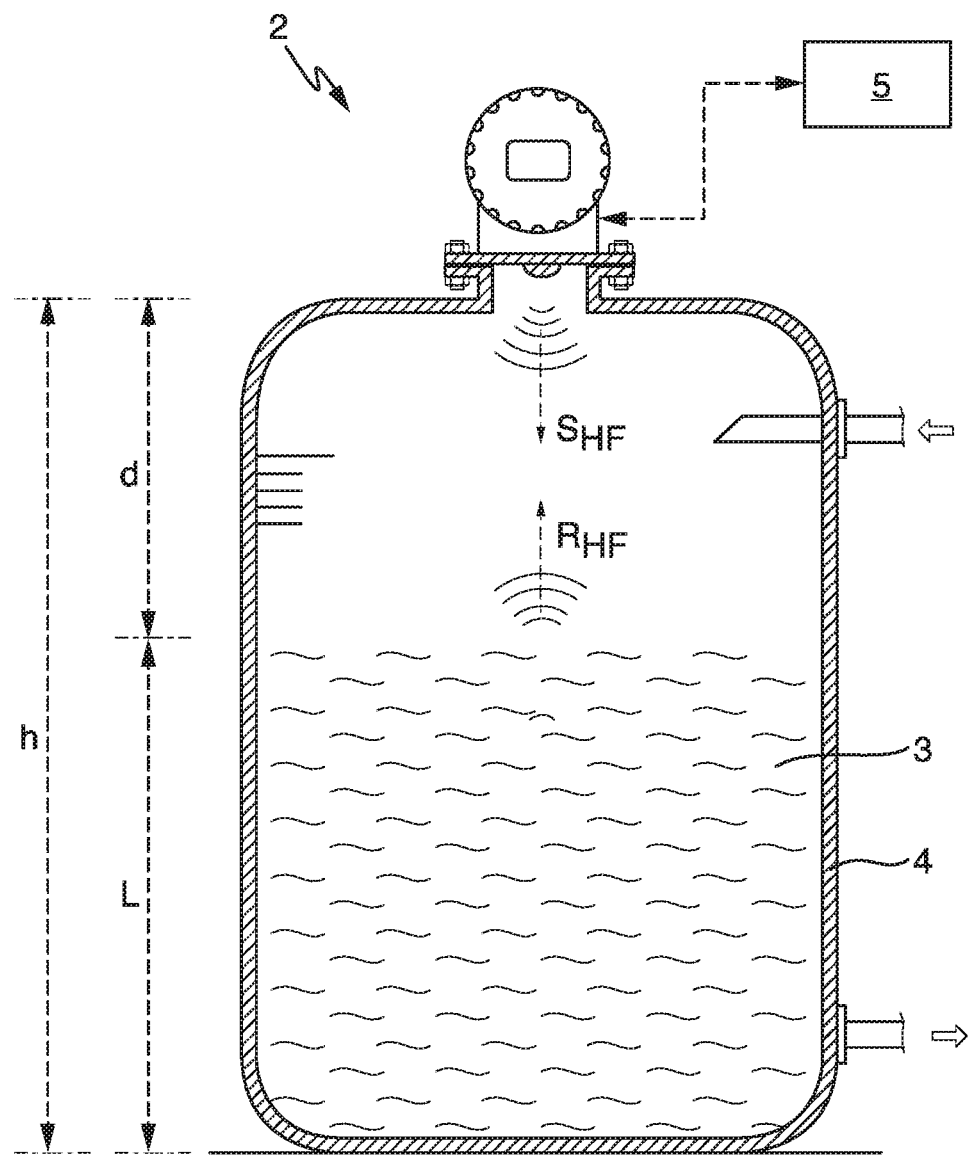
FIG. 5 shows an application of the high-frequency module of the invention in a fill-level measuring device.

FIG. 5 shows application of the high frequency module 1 of the invention in a fill-level measuring device 2. In such case, the fill-level measuring device 2 serves for measuring fill level L of a fill substance 3 located in a container 4. Fill substance 3 can, on the one hand, be a liquid, such as, for example, a refinery product, for instance, oil or liquefied gas, (waste-)water, a drink or a pharmaceutical component; It can, however, also be a solid material, such as gravel, seeds or the like.

For measuring fill level, the fill-level measuring device 2 is mounted on the container 4 at a known installed height h above the container floor. In such case, the fill-level measuring device 2 is so oriented on the container 4 that radar signals $S_{HF}$ produced by means of the high frequency module 1 are transmitted in the direction of the surface of the fill substance 3. In this case, the high frequency module 1 couples the high frequency signal $s_{HF}$ to be transmitted as radar signal $S_{HF}$ into a corresponding (hollow conductor-) antenna of the fill level measuring device 2. After reflection on the fill substance surface, the reflected radar signal $R_{HF}$ is received by the antenna and fed appropriately back as high frequency signal $r_{HF}$ of the high frequency module 1. In such case, the fill-level measuring device 2 receives the reflected radar signal $R_{HF}$ as a function of the distance d=h−L to the fill substance surface. Since the installed height h is known (depending on process plant, the installed height h can be 100 m or more), the fill level L can be determined by means of the above formula based on the measured distance d. In the case of implementing the pulse-travel time method, the distance d is calculated based on the measured pulse-travel time t of the transmitted, pulse shaped radar signal $S_{HF}$. In the FMCW method, the distance d is ascertained via the difference frequency between the instantaneously transmitted, frequency-modulated radar signal $S_{HF}$ and the received, reflected radar signal $R_{HF}$.

As a rule, the fill-level measuring device 2 is connected via a bus system, for instance, a "PROFIBUS", "HART", "wireless HART" or "Ethernet" bus system, with a superordinated unit 5, for example, a process control system or a database accessed per Internet. In this way, on the one hand, information concerning the operating state of the fill level measuring device 2 can be communicated. Also information concerning the fill level L can be transferred, in order, in given cases, to control inflow or outflow of the container 4.

Since the fill-level measuring device 2 uses the high frequency module 1 of the invention, it profits from a low power consumption as well as from radar frequencies potentially above 100 GHz. In such case, the high radar frequency brings with it, above all, a compactly dimensioned antenna, a correspondingly narrow radiation lobe of the radar signal $S_{HF}$ as well as a high resolution of the fill level L in the sub-millimeter range.

The invention claimed is:

1. A high frequency module, comprising:
   a semiconductor component, which is embodied to produce or to process electrical, high frequency signals with a frequency of at least about 60 GHz, and to convert the received high frequency signal into an evaluation signal with a lower frequency;
   a dielectric coupling element, which is contacted with the semiconductor component, in order to couple the high frequency signals as radar signals into:
   a dielectric waveguide, or in order to couple radar signals from the waveguide as electrical, high frequency signals into the semiconductor component, wherein the coupling element and the waveguide form a plug contact;
   wherein the plug contact is embodied as a depression in the waveguide or in the coupling element, and as a corresponding structure in the other component, namely the coupling element or the waveguide.

2. The high frequency module of claim 1, wherein the depression is conically embodied and wherein the structure, which corresponds to the depression, is formed with corresponding conical, or frustoconical shape.

3. The high frequency module of claim 1, wherein the plug contact is embodied engageably.

4. The high frequency module of claim 1, wherein the coupling element is secured on the semiconductor component using an adhesive.

5. The high frequency module of claim 1, wherein, for in-coupling of the radar signals into the coupling element, the semiconductor component has a planar metal structure, with a minimum edge length of a fourth of the wavelength of the radar signals.

6. The high frequency module of claim 1, wherein the coupling element and the waveguide have in the region of the plug contact a jacketing.

7. The high frequency module of claim 1, wherein the semiconductor component is arranged on a circuit board substrate, wherein the waveguide is held in a cover, wherein the cover is secured on the circuit board substrate.

8. The high frequency module of claim 1, wherein the semiconductor component is encapsulated with a potting compound in such a manner that the semiconductor component remains free of potting compound at its contact with the coupling element.

9. The high frequency module of claim 1, wherein the coupling element or the waveguide are/is manufactured of a dielectric material having a dielectric constant of at least two.

10. A radar based distance measuring device for determining a distance to a measured object, comprising:
    a high frequency module including: a semiconductor component, which is embodied to produce or to process electrical, high frequency signals; a dielectric coupling element, which is contacted with the semiconductor component, in order to couple the high frequency signals as radar signals into: a dielectric waveguide, or in order to couple radar signals from the waveguide as electrical, high frequency signals into the semiconductor component, wherein the coupling element and the waveguide form a plug contact; and adjoining the waveguide, an antenna, which is embodied to transmit radar signals toward the measured object and after reflection on the measured object to receive reflected radar signals back;

wherein the semiconductor component is embodied to determine the distance based at least on the reflected radar signals.

11. A method for manufacturing a high frequency module, comprising method steps as follows:

securing a dielectric coupling element on the semiconductor component;

plugging a dielectric waveguide into the coupling element at the plug contact;

a high frequency module including: the semiconductor component, which is embodied to produce or to process electrical, high frequency signals; the dielectric coupling element, which is contacted with the semiconductor component, in order to couple the high frequency signals as radar signals into: the dielectric waveguide, or in order to couple radar signals from the dielectric waveguide as electrical, high frequency signals into the semiconductor component, wherein the dielectric coupling element and the dielectric waveguide form the plug contact.

* * * * *